United States Patent [19]

Itamoto et al.

[11] Patent Number: 4,541,717
[45] Date of Patent: Sep. 17, 1985

[54] ATTRACTION HOLDING DEVICE

[75] Inventors: Shigeru Itamoto; Kenji Yasuda; Senji Mikami, all of Saitama, Japan

[73] Assignee: Fuji Photo Optical Co., Ltd., Japan

[21] Appl. No.: 559,366

[22] Filed: Dec. 8, 1983

[51] Int. Cl.[4] .................... G01N 21/46; G01B 9/02
[52] U.S. Cl. .................... 356/244; 356/359; 356/360
[58] Field of Search .................... 356/244, 359, 360

[56] References Cited

U.S. PATENT DOCUMENTS

| | | | |
|---|---|---|---|
| 4,089,607 | 5/1978 | Rambauske | 356/360 |
| 4,145,140 | 3/1979 | Fujii | 356/360 |
| 4,304,464 | 12/1981 | Hill et al. | 356/360 X |
| 4,347,441 | 8/1982 | Dil et al. | 356/358 X |
| 4,387,994 | 6/1983 | Balasubramanian | 356/360 |

Primary Examiner—Alexander S. Thomas
Assistant Examiner—Mukund J. Shah
Attorney, Agent, or Firm—Saidman, Sterne, Kessler & Goldstein

[57] ABSTRACT

A device for holding a measurement object e.g. in interferometers comprises a base plate and an attraction plate mounted on the base plate so as to attract the object placed on an upper surface of the attraction plate to the base plate together with the attraction plate by a vacuum applied via attraction grooves formed on the base plate and attraction passages perforated through the attraction plate. The upper surface of the base plate is formed as a reflection plane, and the attraction plate is made of a transparent material, so that Newton's rings generated by light reflected from the upper surface of the base plate and light reflected from the lower surface of the attraction plate can be observed from above the attraction plate.

6 Claims, 2 Drawing Figures

ATTRACTION HOLDING DEVICE

BACKGROUND OF THE INVENTION

1. Field of the Invention

This invention relates to an attraction holding device for accurately holding a measurement object in an interferometer or the like.

2. Description of the Prior Art

Interferometers such as flatness testers for measuring the flatness of surfaces of measurement objects are widely used, for example, for inspecting the surface flatness of silicon wafers used as a material of integrated circuits (ICs) prior to the IC manufacturing process. In order to accurately measure the surface shape of a measurement object, it is necessary not only to adjust the interference optical system but also to securely mount the object on the interferometer so that the object may not be distorted. Also when the surfaces of parts or objects are processed or machined precisely, for example, in the manufacture of ICs, it is required to securely hold the objects without deforming the objects.

In order to satisfy the aforesaid requirements, there has heretofore been used a method in which the object is held by attraction on a reference plane exhibiting high flatness. Specifically, attraction holes are perforated through the reference plane, the object is placed on the reference plane, and then the object is attracted to the reference plane by a vacuum through the attraction holes.

In the method as described above, an important factor is how to maintain the accuracy of the reference plane in the fabrication of the holding device. Usually, the reference plane is not obtained by cutting and grinding as a structure integrated with a surface plate used as a measurement stage or a holding state, and the like, but instead the reference plane is fabricated separately from the stage for reasons of the formation of the attraction holes and the manufacturing process. In this case, a reference plate on which the reference plane is formed must first be manufactured at a high accuracy, and then accurately mounted on the stage. Heretofore, however, though the reference plate could be manufactured at a high accuracy, it was not always possible to simply judge whether the reference plate was mounted on the stage at a high accuracy or not immediately after the reference plate mounting step. That is, even when fine dust intervened between the stage and the reference plate, it was impossible to find the existence of the fine dust during or immediately after the mounting step, but instead the existence thereof could be found only by the final inspection. Thus the aforesaid method is not an efficient one.

SUMMARY OF THE INVENTION

The primary object of the present invention is to provide an attraction holding device in which the mounting accuracy of an attraction plate corresponding to the aforesaid reference plate can be easily inspected without using any particular measuring instrument.

Another object of the present invention is to provide an attraction holding device which markedly improves the working efficiency.

The attraction holding device in accordance with the present invention comprises an attraction plate made of a transparent material for detachably mounting an object thereon, and a base plate for mounting said attraction plate thereon, the upper surface of said base plate being formed as a reflection plane. The attraction holding device is fabricated so that, when the attraction plate is mounted on the base plate, it is possible to observe a Newton's ring formed by light reflected from the surface of the base plate and light reflected from the lower surface of the attraction plate.

In the present invention, when the attraction holding device is fabricated or set up, it is possible to simply find deformation, if any, of the plane serving as a reference for mounting an object, and the working efficiency is improved markedly. Further, since deformation of the reference plane can be discriminated easily as irregular deformation of a Newton's ring, the discrimination can be carried out without particular skill. Thus, the attraction holding device of the present invention is advantageous for a pre-inspection or the like not only from the viewpoint of manufacturing but also from the viewpoint of users.

DESCRIPTION OF THE PREFERRED EMBODIMENTS

The present invention will hereinbelow be described in further detail with reference to the accompanying drawings.

Figure 1:
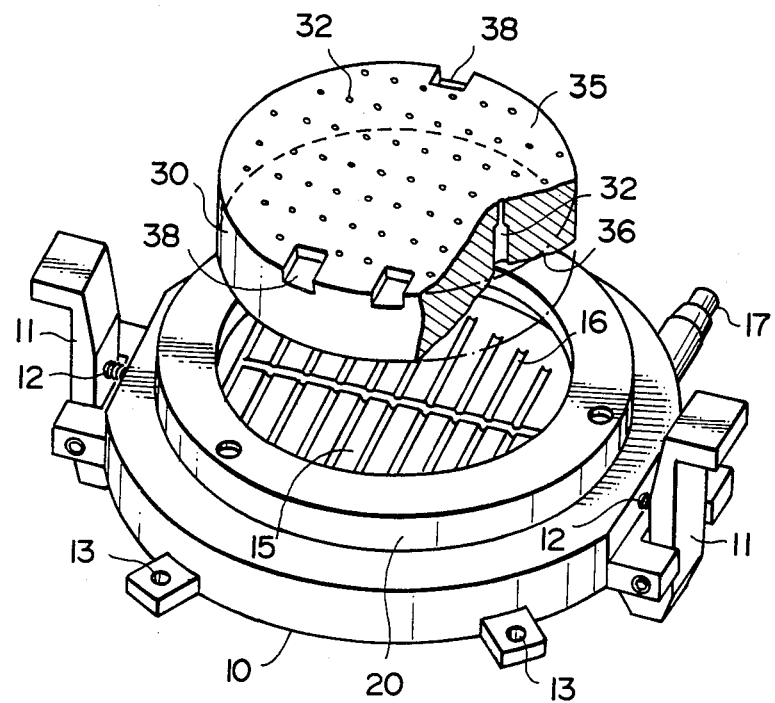
FIG. 1 is a perspective view showing an embodiment of the attraction holding device in accordance with the present invention.
Figure 2:
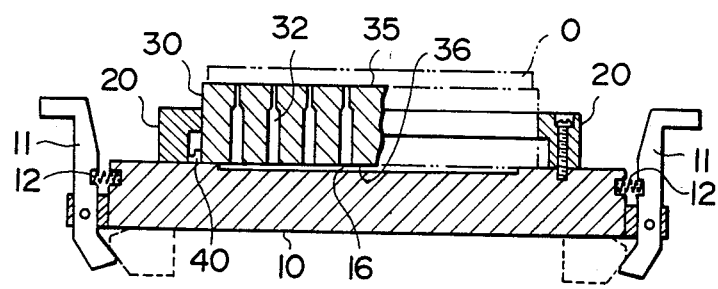
FIG. 2 is a vertical cross-sectional view showing the embodiment of FIG. 1.

Referring to FIGS. 1 and 2 showing an embodiment of the attraction holding device in accordance with the present invention, a base plate 10 generally having a disc-like shape is provided with two hooks 11 pivotably mounted thereon. Each hook 11 is urged by a spring 12 to engage with an engagement section on the stage side, which is indicated by a dotted line in FIG. 2, thereby to clamp the base plate 10 to the stage. The base plate 10 is also provided with pin holes 13. When the base plate 10 is positioned on the stage, the pin holes 13 are aligned with pin holes perforated in the stage, and pins are inserted into the pin holes 13 and the pin holes in the stage. A holding ring 20 is formed, as a ring member having a stepped inner circumference, and is integrated with the base plate 10 by screws. An upper surface 15 of the base plate 10 surrounded by the holding ring 20 is finished to a high flatness so as to act as a reflection plane, and provided with attraction grooves 16 extending in two directions. The base plate 10 is made, for example, of duralumin.

The attraction grooves should preferably be communicated with one another as shown, and a part thereof is communicated with a nozzle 17 for connection with a vacuum pump (not shown).

An attraction plate 30 is made of a transparent material such as silica glass, which should preferably exhibit very little thermal expansion. The attraction plate 30 is provided with attraction passages 32 perforated therethrough, which are distributed approximately uniformly in the surface of the attraction plate 30. As shown in FIG. 2, the diameter of the attraction passages 32 is decreased near the upper surface 35 of the attraction plate 30. Also as shown in FIG. 2, the attraction plate 30 is placed on the base plate 10 so that a lower surface 36 of the attraction plate 30 contacts the upper surface 15 of the base plate 10. In this condition, lower openings of the attraction passages 32 in the attraction plate 30 are communicated with the attraction grooves 16 formed in the upper surface 15 of the base plate 10.

In the upper surface 35 of the attraction plate 30 are formed notches 38 for receiving parts of a conveying mechanism for automatically conveying and detachably mounting an object on the upper surface 35 of the attraction plate 30.

When the attraction plate 30 is mounted on the base plate 10 in the above-described embodiment, light reflected from the upper surface 15 of the base plate 10 interferes with light reflected from the lower surface 36 of the attraction plate 30, and a Newton's ring is generated thereby. Since the attraction plate 30 is transparent, the Newton's ring thus generated can be observed from above the upper surface 35 of the attraction plate 30. When dust or the like intervenes between the base plate 10 and the attraction plate 30, the Newton's ring generated as described above becomes disturbed by dust or the like. Therefore, it is possible to easily discriminate the mounting failure. Normally, since the attraction plate 30 is manufactured as a plate having parallel planes at a high accuracy, about two or three Newton's rings are generated as described above when the mounting condition is adequate. Accordingly, any deformation of the attraction plate 30 due to dust or the like intervening between the attraction plate 30 and the base plate 10 can be discriminated accurately. The Newton's rings can be observed by use of a special light source. However, they can be observed sufficiently even with ambient white light.

When the flatness of an object is measured, the object and the upper surface 35 of the attraction plate 30 for mounting the object thereon may not necessarily be horizontal. However, the upper surface 35 should be flat so that it may not deform the object. Further, when the object is attracted and held by the attraction holding device, attraction should not be effected in such a manner that the object is deformed by attraction. The adverse effects on the object can be minimized by decreasing the diameter of the attraction passages 32 near the upper surface 35 of the attraction plate 30 as shown in FIG. 2.

When the attraction holding device as described above is used, an object O is placed on the upper surface 35 of the attraction plate 30 as shown in FIG. 2, and then a vacuum pump (not shown) connected to the nozzle 17 is started. Thus the object O and the attraction plate 30 are attracted and held on the upper surface 15 of the base plate 10 by a vacuum applied via the attraction grooves 16 and the attraction passages 32. Therefore, the attraction plate 30 and the base plate 10 may not necessarily be secured to each other by the other means. However, in order to prevent dust or the like from entering between the attraction plate 30 and the base plate 10, the attraction plate 30 and the base plate 10 may be bonded to each other by use of a rubber ring 40 and an adhesive agent as shown in FIG. 2 after the attraction plate 30 is initially mounted on the base plate 10.

We claim:

1. An attraction holding device comprising a base plate and an attraction plate mounted on said base plate with a lower surface of said attraction plate contacting an upper surface of said base plate so as to attract an object placed on an upper surface of said attraction plate to said base plate together with said attraction plate by sucking via attraction grooves formed on said base plate and attraction passages perforated through said attraction plate from the lower surface to the upper surface thereof, wherein the improvement comprises forming said upper surface of said base plate as a reflection plane, and constituting said attraction plate by use of a transparent material.

2. A device as defined in claim 1 wherein said attraction passages formed through said attraction plate are distributed uniformly in the plane of said attraction plate, and the diameter of each attraction passage is smaller on the upper surface side of said attraction plate than on the lower surface side of said attraction plate.

3. A device as defined in claim 1 wherein said base plate and said attraction plate have generally disc-like shape.

4. A device as defined in claim 3 wherein a ring member having a stepped inner circumference is secured to said base plate for receiving said attraction plate therein, and said upper surface of said base plate formed as a reflection plane is defined by the inner circumference of said ring member.

5. A device as defined in claim 1 wherein said attraction passages formed through said attraction plate are communicated with one another.

6. A device as defined in claim 1 wherein said base plate and said attraction plate are secured to each other by use of a coupling means.

* * * * *